United States Patent
Maeno et al.

(10) Patent No.: US 7,322,570 B2
(45) Date of Patent: Jan. 29, 2008

(54) FLUID-FILLED VIBRATION DAMPING DEVICE

(75) Inventors: Hajime Maeno, Kasugai (JP); Atsushi Muramatsu, Komaki (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 269 days.

(21) Appl. No.: 11/080,631

(22) Filed: Mar. 16, 2005

(65) Prior Publication Data
US 2005/0206056 A1 Sep. 22, 2005

(30) Foreign Application Priority Data
Mar. 22, 2004 (JP) ............................. 2004-083641

(51) Int. Cl.
*F16F 5/00* (2006.01)
(52) U.S. Cl. ............................. 267/140.13; 267/64.11
(58) Field of Classification Search ........... 267/140.11, 267/140.13, 141.2, 64.11, 64.13; 188/298; 248/562, 636, 637
See application file for complete search history.

(56) References Cited

U.S. PATENT DOCUMENTS

| 4,595,183 A | * | 6/1986 | Dan et al. ............... 267/140.13 |
| 4,721,292 A | | 1/1988 | Saito |
| 4,726,573 A | | 2/1988 | Hamaekers et al. |
| 4,826,126 A | * | 5/1989 | Katayama et al. .......... 248/562 |
| 5,183,243 A | * | 2/1993 | Matsumoto ............ 267/140.13 |
| 5,188,346 A | | 2/1993 | Hamada et al. |
| 5,853,063 A | | 12/1998 | Meyerink et al. |
| 6,672,574 B2 | | 1/2004 | Hamada et al. |

FOREIGN PATENT DOCUMENTS

| JP | A 1-164831 | 6/1989 |
| JP | A 3-121327 | 5/1991 |
| JP | B2 4-17291 | 3/1992 |
| JP | B2 6-105095 | 12/1994 |
| JP | A 2003-148548 | 5/2003 |

* cited by examiner

*Primary Examiner*—Pam Rodriguez
(74) *Attorney, Agent, or Firm*—Oliff & Berridge, PLC

(57) ABSTRACT

A fluid-filled vibration damping device including: an elastic body connecting a first and a second mounting member, defining a pressure receiving chamber undergoing pressure fluctuation during input of vibration; an equilibrium chamber defined by a flexible layer for permitting its volume change; an orifice passage connecting the pressure receiving chamber and equilibrium chamber; a movable member; and a short passage for connecting two chambers with a length smaller than that of the orifice passage. When pressure in the pressure-receiving chamber increases, the movable member is displaced or deformed toward to close the equilibrium-chamber-side opening of the short passage to have the short passage substantially closed, while when pressure in the pressure-receiving chamber decreases, the movable member is displaced or deformed to have the short passage operative.

9 Claims, 6 Drawing Sheets

FLUID-FILLED VIBRATION DAMPING DEVICE

INCORPORATED BY REFERENCE

The disclosure of Japanese Patent Application No. 2004-083641 filed on Mar. 22, 2004 including the specification, drawings and abstract is incorporated herein by reference in its entirety.

BACKGROUND OF THE INVENTION

1. Field of the Invention

The present invention relates generally to fluid-filled vibration damping devices suitably used as an automobile engine mount, body mount, differential mount, and the like, and more particularly to a fluid-filled vibration damping device capable of exhibiting vibration damping effect based on vibration damping characteristics exhibited by flow action of the fluid sealed therein.

2. Description of the Related Art

As one type of vibration damping couplings or mounts, there is known a fluid-filled vibration damping device that is capable of exhibiting vibration damping effect on the basis of resonance or flow action of the non-compressible fluid sealed therein.

In order to meet a demand to damp vibration of plural types, such a fluid-filled vibration damping device has been arranged to have an orifice passage for providing damping action effective for vibration of low frequency band, and a movable member for providing damping action effective for vibration of high frequency band in combination. JP-B-4-17291, JP-A-1-164831, JP-A-3-121327 and JP-A-2003-148548 show specific examples of such vibration damping devices, for example. These devices may be used as an automobile engine mount, and will exhibit excellent vibration damping effect for both low-frequency and large-amplitude vibration such as engine shakes, and high-frequency and small-amplitude vibration such as booming noises.

Meanwhile, these fluid-filled vibration damping devices having such a conventional structure, may suffer from relatively large vibration transmission or impulsive noises created when an impulsive substantial vibrational load is applied between the first mounting member and the second mounting member. For instance, when the conventional device is used as an automobile engine mount, such vibration and noises may be created upon engine cranking or abrupt acceleration of the vehicle.

The present inventors have conceived that the relatively large vibration and impulsive noises may be created when gas once separated from the sealed fluid due to an excess negative pressure generated in a pressure receiving chamber where an amount of flow of the fluid through the orifice passage is limited, are again dissolved in the sealed fluid.

To address the aforementioned problem, the present assignee has been proposed in JP-A-2003-148548 a modified fluid-filled vibration damping device wherein additionally provided is a short passage to make the orifice passage short, and a valve means for closing the short passage. In this device, when a negative pressure in the pressure-receiving chamber excessively increases, the valve means is operated to open the short passage, thereby eliminating excess increase of the negative pressure in the pressure-receiving chamber.

However, the proposed structure disclosed in JP-A-2003-148548 needs not only to incorporate the valve means but to control operation of the valve means precisely, thereby needing a sophisticated construction and maintenance of the device. Therefore, there is a room for improvement for reducing the proposed device to practice.

SUMMARY OF THE INVENTION

It is therefore one object of the present invention to provide a fluid-filled vibration damping device of improved structure which is capable of ensuring excellent vibration damping device on the basis of flow action of the non-compressible fluid sealed therein, while eliminating or minimizing creation of vibration or noise upon input of impulsively large vibration or load thereto, and which is readily cheap to manufacture with a reduced number of components and a simple construction.

The above and/for optional objects of this invention may be attained according to at least one of the following modes of the invention. Each of these modes of the invention is numbered like the appended claims and depending from the other mode or modes, where appropriate, to indicate possible combinations of elements or technical features of the invention. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a fluid-filled vibration damping device comprising: a first mounting member; a second mounting member disposed spaced away from the first mounting member; a rubber elastic body elastically connecting the first and second mounting member together; a pressure receiving chamber partially defined by the rubber elastic body and filled with a non-compressible fluid, the pressure receiving chamber undergoing fluid pressure fluctuation during input of vibration to the device; an equilibrium chamber partially defined by a flexible layer for permitting a volume change thereof and filled with the non-compressible fluid; an orifice passage permitting a fluid communication be the pressure receiving chamber and the equilibrium chamber; a movable member disposed so as to partition the pressure receiving chamber and the equilibrium chamber from each other, and being elastically displaceable or deformable due to pressure difference between the pressure receiving chamber and the equilibrium chamber exerted on opposite faces thereof so that pressure fluctuation induced in the pressure receiving chamber in a frequency band higher than a tuning frequency of the orifice passage is absorbed to avoid a high dynamic spring constant of the mount; at least one short passage connecting between the pressure receiving chamber and the equilibrium chamber with a passage length smaller than that of the orifice passage, wherein an equilibrium-chamber-side opening of the short passage is open to a region where the movable member is displaced or deformed, and when pressure in the pressure-receiving chamber increases, the movable member is displaced or deformed toward the equilibrium chamber to thereby close the equilibrium-chamber-side opening of the short passage to have the short passage substantially closed, while when pressure in the pressure-receiving chamber decreases, the movable member is displaced or deformed toward the pressure-receiving chamber to have the short passage operative.

In the fluid-filled vibration damping device of construction according to this mode, the short passage operable for avoiding excessive Increase of the negative pressure in the pressure receiving chamber, by effectively utilizing movable member conventionally used for exhibiting vibration damping effect with respect to input vibration in a high frequency band, without needing special valve mean or the like.

Namely, when an Interior pressure in the pressure receiving chamber decreases upon application of a relatively large load, the movable member is displaced or deformed to thereby bring the short passage into operative state, so that the fluid flow between the pressure-receiving chamber and the equilibrium chamber are permitted via the short passage whose length is smaller than that of the orifice passage. Therefore, effectively avoided is excessive increase of the negative pressure in the pressure receiving chamber caused by input of impulsive large load to the device, thereby preventing separation of gas from the sealed fluid and resultant impulsive vibration or noises, as well.

Furthermore, during input of low frequency and large amplitude vibration to which the orifice passage is tuned, where the pressure receiving chamber is in a positive pressure state, the movable member closes the short passage, thereby assuring a sufficient amount of fluid flow through the orifice passage, thus exhibiting intended vibration damping effect with respect to low frequency vibration.

A second mode of the invention provides a fluid-filled vibration damping device according to the first mode, wherein the partition member is fixedly supported by the second mounting member, and is provided with a through hole, and the movable member is disposed within the through hole and is supported in a displaceable or deformable state by means of the partition member, while the orifice passage is formed radially outward of the movable member by utilizing the partition member.

According to this mode, the partition member partitioning the pressure receiving chamber and the equilibrium chamber from each other is utilized to support the movable member as well as to form the short passage, making it possible to made the device compact in size.

A third mode of the invention provides a fluid-filled vibration damping device according to the second mode, wherein a plurality of short passages are formed at respective circumferential positions situated radially outward of the movable member.

According to this arrangement, the plurality of short passages are open to the pressure receiving chamber at a plurality of locations, whereby abrupt increase of the negative pressure in the pressure receiving chamber upon input of impulsive large load, can be rapidly reduced over a wide area of the pressure receiving amber. Thus, gas separation caused by local increase of the negative pressure can be effectively eliminated.

A fourth mode of the invention provides a fluid-filled vibration damping device according to the second or third mode, further comprising a first restricting plate disposed in an area where the through hole is formed, sad situated to be opposed to and spaced away by a given distance from the movable member in an axial direction toward the equilibrium chamber, wherein the first restricting plate having a through hole perforated through a central portion thereof so as to permit displacement or deformation of the movable member by means of fluid flow through the through hole, and the displacement or deformation of the movable member is limited by bringing the movable member into abutting contact with the first restricting plate, wherein the equilibrium-chamber-side opening of the short passage is open to an area between the movable member and the first restricting plate so that the short passage is held in communication with the equilibrium chamber via the through hole of the first restricting plate, and wherein when pressure in the pressure-receiving chamber increases, the movable member is displaced or deformed toward the equilibrium chamber and is hold in abutting contact with the first restricting member so that through hole is closed to have the short passage closed.

A fifth mode of the invention provides a fluid-filled vibration damping device according to the fourth mode, wherein the movable member comprises a movable plate formed independently of the partition member, and the movable plate is disposed within the through hole of the partition member such that the movable plate is displaceable in a thickness direction thereof while being guided along an inner circumferential surface of the through hole, and that the equilibrium-chamber-side opening of the short passages open to a vicinity of an equilibrium-chamber-side end of the inner circumferential surface of the through hole.

In this mode, with the movable member held in abutting contact with the restricting plate, the short passage can be closed by means of the movable member with improved stability.

A sixth mode of the invention provides a fluid-filled vibration damping device according to the fourth mode, wherein the movable member comprises an elastic plate that is disposed within the through hole of the partition member with an outer rim thereof bonded to an inner circumferential surface of the through hole so that the elastic plate is elastically deformable in a thickness direction thereof, and the equilibrium-chamber-side opening of the short passage is open to a vicinity of an equilibrium-chamber-side end of the inner circumferential surface of the through hole.

In this mode, the short passage can be closed with high stability by utilizing the elastic plate that comes into abutting contact with the partition member by elastic deformation thereof.

A seventh mode of the invention provides a fluid-filled vibration damping device according to the fourth mode, wherein the second mounting member is of cylindrical tubular configuration, the first mounting member is situated on a side of one open end of the second mounting member with a spacing therebetween, the rubber elastic body is disposed between and elastically connects the first and second mounting member with the one open end of the second mounting over fluid-tightly closed by means of the rubber elastic body, an other open end of the second mounting member is fluid-tightly closed by the flexible layer, the partition member is supported by the second mounting member to extend in a direction perpendicular to an central axis of the second mounting member so that the pressure receiving chamber is defined between the partition member and the rubber elastic body while the equilibrium chamber is defined between the partition member and the flexible layer.

According to this mode, the pressure receiving chamber, the equilibrium chamber, and the movable plate installed within the partition member, as well are formed within the second mounting member with high space utilization, making the fluid-filled vibration damping device compact overall.

An eight mode of the invention provides a fluid-filled vibration damping device according to any one of the second through seventh modes, wherein the device is used as an automotive engine mount by fixing one of the first and second mounting members to a power unit of a vehicle, and an other of the first and second mounting members to a body of the vehicle, and the orifice passage is tuned to a low frequency band corresponding to engine shakes, and the movable member is tuned so that the engine mount exhibits low dynamic spring constant during input of high frequency vibration corresponding to booming noises by means of displacement or deformation of the movable member.

According to this mode, an automotive engine mount capable of exhibiting excellent damping effect with respect to low frequency vibration such as engine shakes and high frequency vibration such as booming noises, as well, with a relatively simple construction.

As will be understood from the foregoing description, in the fluid-filled vibration damping device of connection according to the present invention, the short passage(s) can be brought into an operative state or a closed state by utilizing movable member that is displaced or deformed in accordance with the pressure fluctuation in the pressure receiving chamber. Therefore, gas separation in the sealed fluid due to impulsive input of large load and resultant vibration and noise can be advantageously avoided, without needing sophisticated components or mechanisms.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
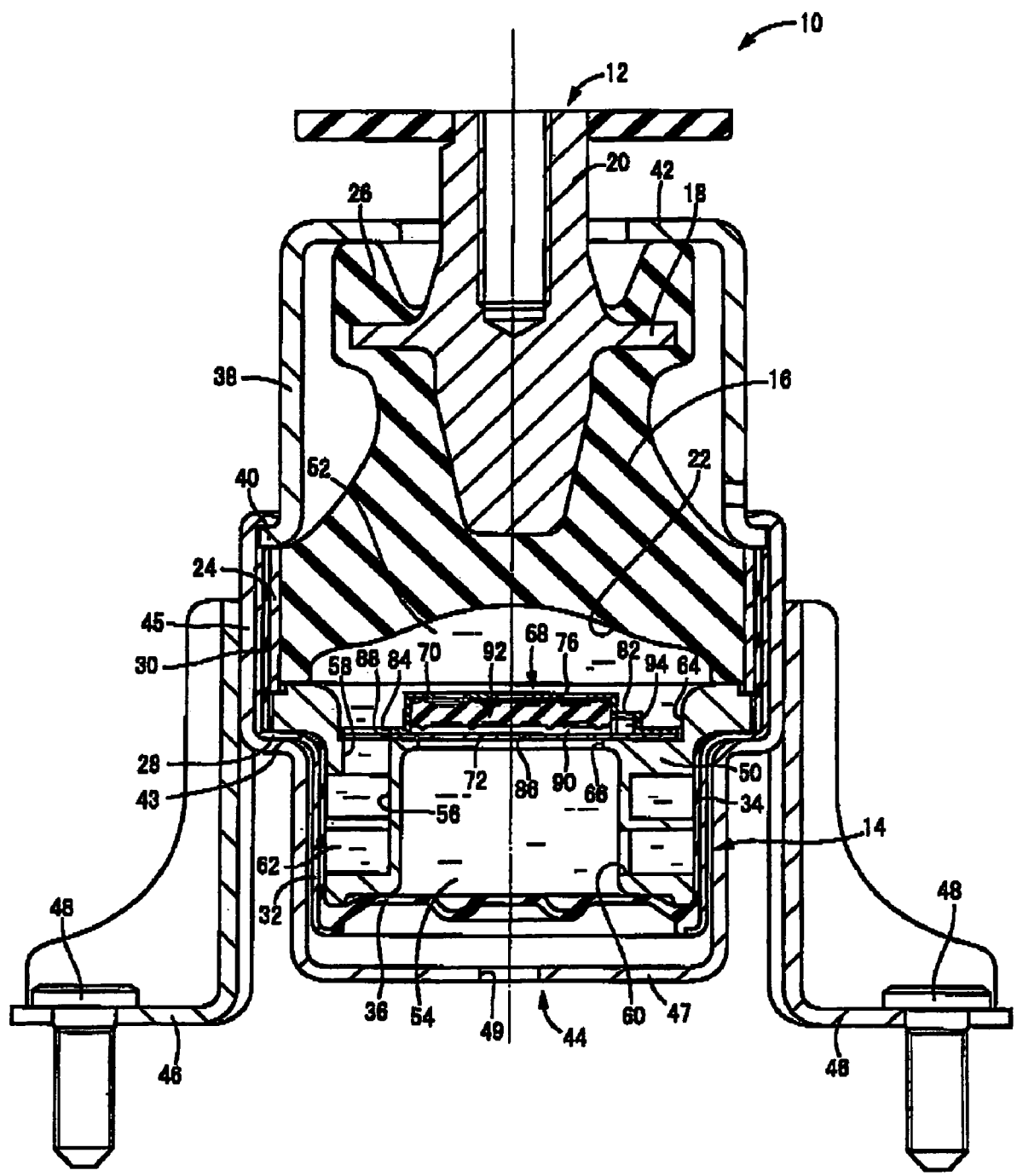
FIG. 1 is an elevational view in axial or vertical cross section of a fluid-filled vibration-damping device in the form of an automobile engine mount that is constructed according to a first embodiment of the invention.
Figure 5:
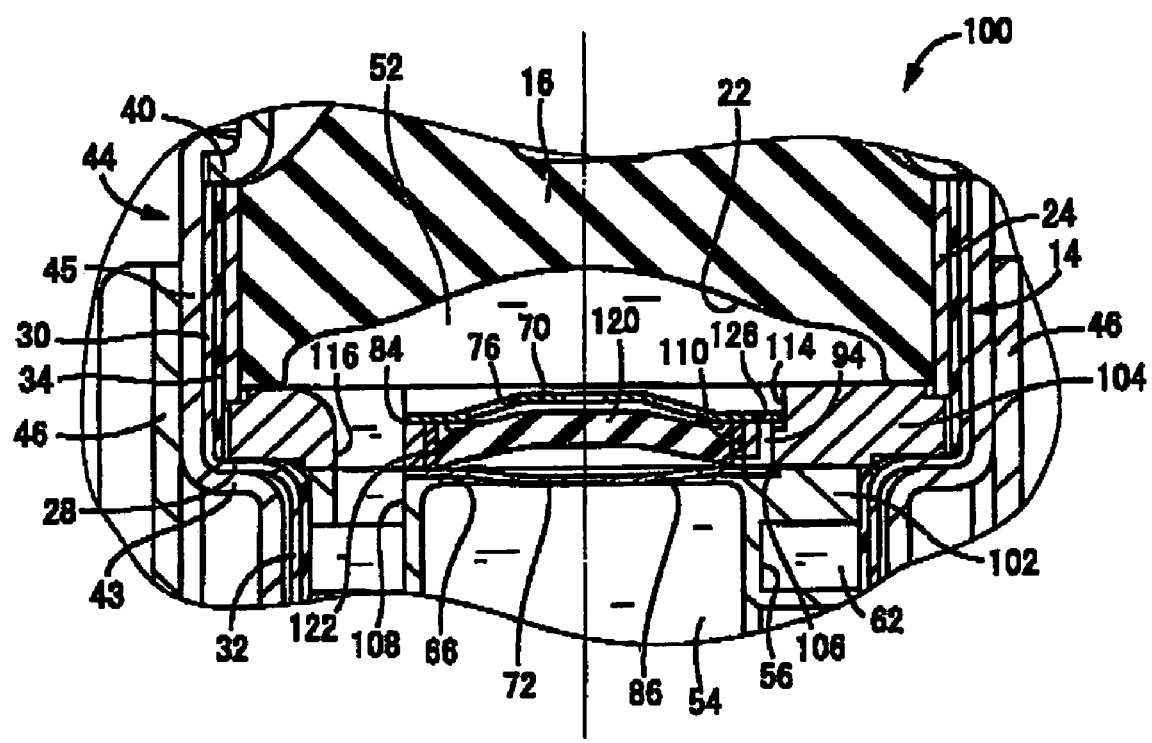
FIG. 5 is an elevational view in axial or vertical cross section of a fluid-filled vibration-damping device in the form of an automobile engine mount that is constructed according to a second embodiment of the invention.

Referring first to FIG. 1, shown is an engine mount 10 for an automotive vehicle, having construction according to a first embodiment of a fluid-filled vibration damping device of the present invention. The engine mount 10 includes a first mounting member 12 of metal, a second mounting member 14 of metal, and an rubber elastic body 16 by which are elastically connected the first mounting member 12 and the second mounting member 14 disposed spaced away from each other. The engine mount 10 is installed on the vehicle such that the first mounting member 12 is fixed to the power unit side of the vehicle, while the second mounting member 14 is fixed to the body side of the vehicle, whereby the engine mount 10 fixedly supports the power unit on the body of the vehicle in a vibration damping fashion, like conventional engine mounts. With the engine mount 10 installed on the vehicle as described above, the rubber elastic body 16 undergoes elastic deformation due to a static load or weight of the power unit exerted thereon, whereby the first and second mounting member 12, 14 am displaced toward each other by a given amount in the vertical direction as seen in FIG. 1, along which a vibrational load to be dammed is applied between the first and second mounting members 12, 14. In the following description, the vertical direction shall be conformed to the vertical direction as seen in FIGS. 1 and 5, unless otherwise specified.

More specifically, the first mounting member 12 is of a generally inverted frustoconical configuration, and includes a flange 18 integrally formed at a large diameter end portion so as to protrude diametrically outwardly, as well as a nut portion 20 integrally formed at a central portion of its large diameter end face projecting axially upwardly. By means of a mounting bolt (not shown) to be thread-engaged into a tapped hole formed through the nut portion 20, the first mounting member 12 is attached to the power unit side of the vehicle.

To the first mounting member 12, the rubber elastic body 16 is bonded through vulcanization of a rubber material for forming the rubber elastic body 16 (hereinafter referred to simply as "vulcanization" where appropriate). The rubber elastic body 16 has a generally frustoconical configuration overall, with a relatively large diameter gradually increasing a its goes axially downwardly. The first mounting member 12 is concentrically disposed with and bonded by vulcanization to the rubber elastic body 16 with the first mounting member 12 protruded axially downward into the rubber elastic body 16 from a small diameter and face of the rubber elastic body 16. The rubber elastic body 16 further includes a large-diameter recess 22, which is open in a large diameter end face of the rubber elastic body 16, to thereby minimize or eliminate tensile stress that would be generated in the rubber elastic body 16 upon input of a support weight of the power unit. In addition, a metallic sleeve 24 of large-diameter tubular configuration is superimposed and bonded by vulcanization onto an outer circumferential surface of the large diameter end portion of the rubber elastic body 16. Thus, there is provided an integral vulcanization product of the rubber elastic body 16 equipped with the first mounting member 12 and the metallic sleeve 24. On the flange 18, there is formed a cushion rubber 26 projecting axially upwardly and integrally formed with the rubber elastic body 16.

The second mounting member 14 is of a generally stepped tubular configuration heaving a relatively large diameter. The second mounting member 14 includes a shoulder portion 28 formed at an axially intermediate portion thereof, a large diameter portion 30 on the axially upper side and a small diameter portion 32 on the axially lower side. A thin sealing rubber layer 34 is bonded through vulcanization of a rubber material for forming thereof to an inner circumferential surface of the second mounting member 14, thereby coating substantially entire area of the inner circumferential surface of the second mounting member 14. At one open end of the second mounting member 14 on the small-diameter portion 32 side, there is provided a flexible layer in the form of a thin shaped flexible diaphragm 36 made of a thin rubber layer, and integrally formed with the selling rubber layer 34. With the flexible diaphragm 36 integrally bonded at its peripheral portion to the opening peripheral edge of the second mounting member 14, the lower open end of the second mounting member 14 is closed with fluid tightness.

The second mounting member 14 of construction as described above is externally fitted at its large diameter portion 30 onto the metallic sleeve 24, and secured thereon by pressing, drawing or other possible fixing process, whereby the second mounting member 14 is bonded onto the integral vulcanization product of the rubber elastic body 16 equipped with the first mounting member and the metallic sleeve 24. Thus, the first mounting member and the second mounting member are generally concentrically disposed with a common axis thereof extends along a primary vibration input direction (vertical direction in FIG. 1) in which vibration to be damped are applied to the engine mount 10, and are spaced away from each other in the primary vibration input direction, and are elastically connected to each other by the rubber elastic body 16. With the large diameter portion 30 of the second mounting member 14 bonded to the rubber elastic body 16, the upper open end of the second mounting member 14 is closed with fluid-tightness by the rubber elastic body 16.

The second mounting member 14 is assembled with a tubular metallic stop member 38. The stop member 38 includes at its axially lower end a flange 40 extending diametrically outwardly at which the stop member 39 is superimposed on the upper ends of the second mounting member 14 and the metallic sleeve 24. The stop member 38 also includes an annular abutting projection 42 integrally formed at its axially upper end and projecting diametrically inwardly. The abutting projection 42 is situated axially above the flange 18 of the first mounting member with an axial interval therebetween. Upon application of a large vibrational load, the flange 18 comes into abutting contact with the abutting projection 42 via the cushion rubber 26, thereby limiting an amount of displacement between the first and second mounting members 12, 14 relative to each other in a so-called "rebound direction" or a direction in which the first and second mounting members 12, 14 move toward each other.

The second mounting member 14 is sheathed into a metallic retainer member 44 having a generally cylindrical stepped cup shape of large diameter. In the retainer member 44, a shoulder portion 43 is formed at its axially intermediate portion, and a large diameter portion 45 is formed on the upper side thereof. The large diameter portion 45 is externally fitted onto the large diameter portion 30 of the second mounting member 14, and secured thereon by pressing, drawing or other possible fixing process. The shoulder portion 43 is superimposed onto the shoulder portion 28 of the second mounting member 14, and the upper end of the retainer member 44 is subjected to caulking operation, to thereby be forcedly scoured onto the flange 40 of the stop member 38 superimposed onto the upper end of the second mounting member 14. Thus, the retainer member 44 is secured to the second mounting member 14 together with the retainer member 44. It should be noted that in order to permit an expansive deformation of the diaphragm 36 toward axially downwardly, a sufficient volume of space is formed between a floor portion 47 of the retainer member 44 and the diaphragm 36. The retainer member 44 includes an air hole through which the space is exposed to the outside area.

A plurality of fixing brackets 46 are fixed by welding to an outer circumferential surface of the retainer member 44, and extend axially downwardly. With the plurality of brackets 46 fixed to the body of the vehicle by means of bolts, the second mounting member 14 are fixedly mounted onto the body of the vehicle.

A metallic partition member 50 is housed within the second mounting member 14 such that the partition member 50 is disposed at an axially intermediate portion of the second mounting member 14. This partition member 50 is a generally inverted cup shaped member having an upper floor whose outer rim projects diametrically outwardly. With the outer rim of the upper floor of the partition member 50 sandwiched between the lower end of the metallic sleeve 24 and the shoulder portion 28 of the second mounting member 14, the partition member 50 is fitted into the small diameter portion 32 of the second mounting member 14. That is, the partition member 50 is forcedly fitted into the small diameter portion 32 of the second mounting member 14, for example by press fitting the partition member 50 into the small diameter portion 32 or by drawing the small diameter portion 32 onto the partition member 50 disposed therein. Thus, an outer circumferential surface of the partition member 50 is fluid-tightly fixed onto the small diameter portion 32 of the second mounting member 14 via the sealing rubber layer 34.

With the partition member 50 assembled with the second mounting member 14 as described above, a region defined by ad between the rubber elastic body 16 and the diaphragm 36 and fluid-tightly closed up from the external area is partitioned with fluid-tightness into two areas. Namely, on the axially upper side of the partition member 50 is formed a pressure receiving chamber 52 partially defined by the rubber elastic body 16 and functioning as a pressure-receiving chamber, and on the axially lower side of the partition member 50 is formed an equilibrium chamber 54 partially defined by the flexible diaphragm 36 and having a volume valuable based on the deformation of the flexible diaphragm 36. The pressure receiving chamber 52 and the equilibrium chamber 54 are both filled with a non-compressible fluid such as water, alkylene glycol, polyalkylene glycol and silicone oil. For effective damping performance based on resonance of the fluid, which will be described in detail later, it is preferable to employ a low-viscosity fluid whose viscosity is not higher than 0.1 Pa·s. For instance, the assembling of the integral vulcanization produce consisting of the rubber elastic body 16, the first mounting member 12 and the metallic sleeve 24 with an integral vulcanization product consisting of the second mounting member 14 and the diaphragm 36 and the partition member 50, may be affected within a mass of the non-compressible fluid, thus facilitating filling the pressure receiving chamber 52 and the equilibrium chamber with the non-compressible fluid.

The partition member 50 has a circumferential groove 56 open in the our circumferential surface of the partition member 50 and spirally extending in the circumferential direction. The opening of the circumferential groove 56 is fluid-tightly closed by the small diameter portion 32 of the second mounting member 14. One end of the circumferential groove 56 is hold in communication with the pressure-receiving chamber 52 through a communication hole 58 perforated through the upper wall portion of the partition member 50, while the other end of the circumferential groove 56 is held in communication with the equilibrium chamber 54 through a communication hole 60 perforated through a side wall portion of the partition member 50. With this arrangement, the circumferential groove 56 and the second mounting member 14 cooperate with each other to provide an orifice passage 62 through which the pressure-receiving chamber 52 and the equilibrium chamber 54 are held in fluid communication. This makes it possible to induce relative pressure fluctuation between the pressure receiving chamber inducing pressure fluctuation due to elastic deformation of the robber elastic body and the equilibrium chamber having a volume variable due to elastic deformation of the diaphragm 36, thus causing flow action of the non-compressible fluid flowing through the orifice passage 62 between the both chambers 52, 54. Therefore, the engine mount 10 is capable of exhibiting vibration, damping affect to the target input vibration on the basis of resonance or flow action of the fluid flowing through the orifice passage 62. For instance, a natural frequency of the orifice passage 62 is tuned so that the engine mount 10 will exhibit effective damping performance with respect to low frequency and large amplitude vibrations, such as engine shakes, on the basis of resonance of the fluid flowing through. The natural frequency of the orifice passage 62 may be adjusted by changing the shape and size thereof.

Further, a central recess 64 is formed at the central portion of the partition member 50 and open to the pressure receiving chamber 52. A communication hole 66 is formed through the bottom wall of the central recess 64 so that the central recess 64 is held in communication with the equilibrium chamber 54 through the communication hole 66. Within the central recess 64, a lid unit 68 is disposed. The lid member 68 includes a metallic upper lid member 70 and a metallic lower cover member 72.

Figure 2:
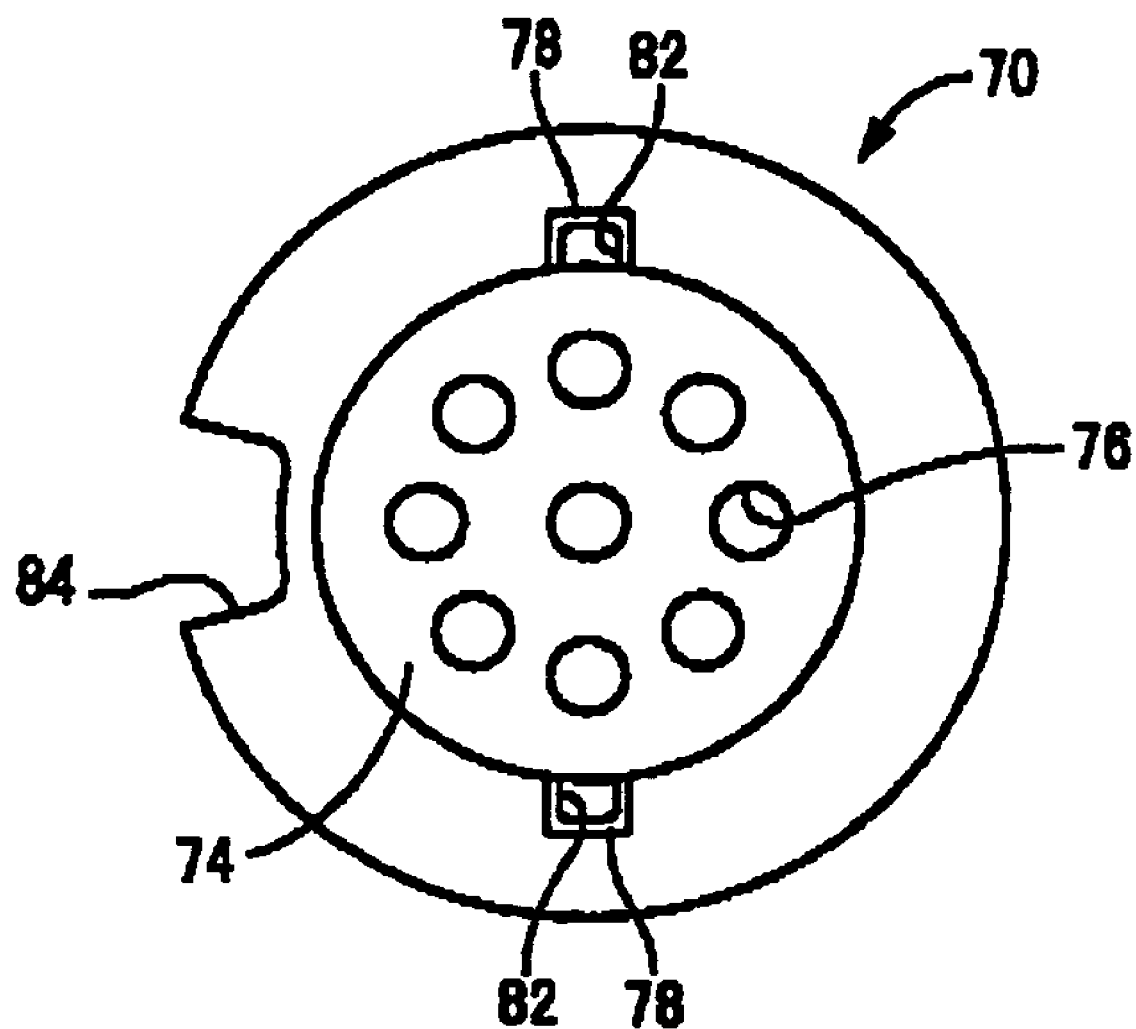
FIG. 2 is a top plane view of an upper lid of the engine mount of FIG. 1.
Figure 3:
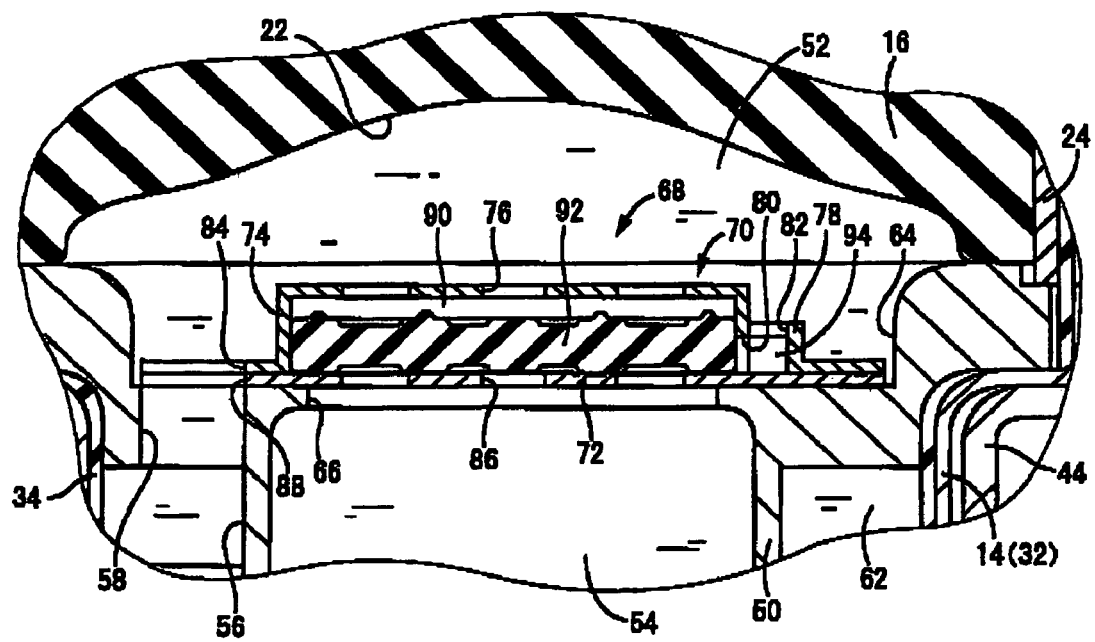
FIG. 3 is a fragmentary enlarged view in vertical cross section of the engine mount of FIG. 1 in one operating state.
Figure 4:
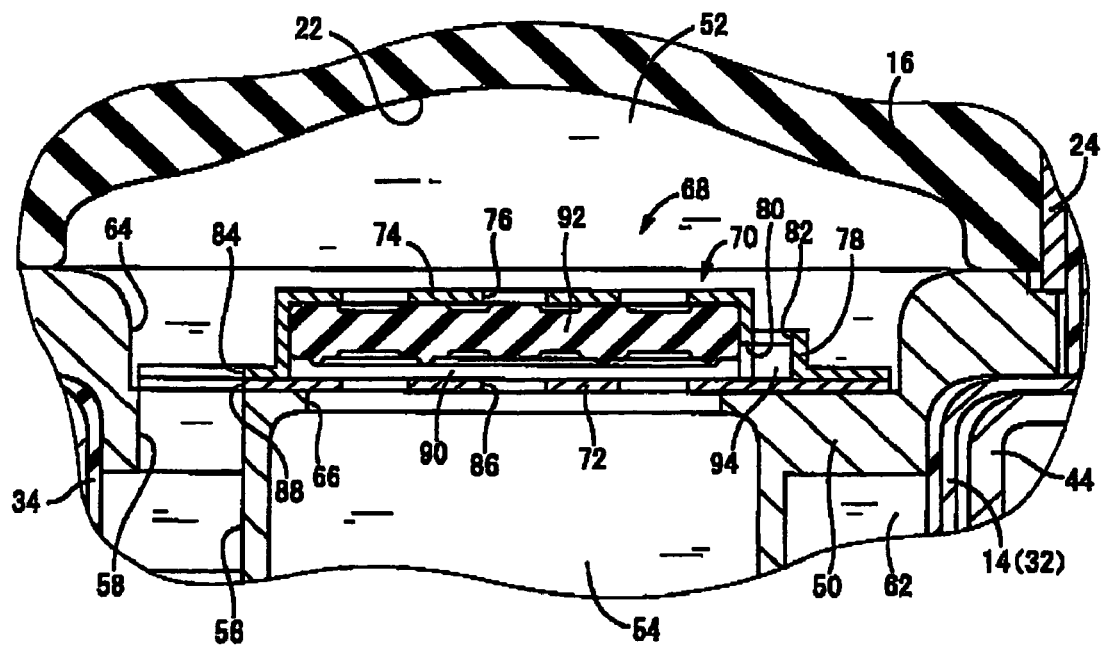
FIG. 4 is a fragmentary enlarged view in vertical cross section of the engine mount of FIG. 1 in another operating state.

More specifically, the upper lid member 70 has a thin disk-like configuration in plane view, as shown in FIG. 2. The upper lid chamber 70 his a hollow central projection 74 integrally formed by pressing its central portion such that the central projection 74 projects axially upward with a generally flat circular top wall. Through the top wall of the central projection 74 are formed a plurality of small circular holes 76. At the distal end side of the side wall of the central projection, there are formed a pair of hollow diametric projections 78 at locations diametrically opposed to each other with the central axis of the central projection 74 interposed with each other. Each diametric projection 78 has a generally rectangular cross sectional shape. As seen in the axial cross section, the central projection 74 has a stepped configuration at the sidewall proximal end portion. As shown in FIGS. 3 and 4, the hollow space within the diametric projection 78 is open to the inside of the central projection 74 through an opening 80 formed through the circumferential wall of the central projection 74, and open to the outside of the central projection 74 through an opening 82 formed through the upper wall of the diametric projection 78. Further, a notch 84 of rectangular shape is formed at an outer peripheral rim of the upper lid member 70 with an opening facing diametrically outward.

The lower lid member 72 is a thin disk-like member having a plurality of circular openings 86 formed through the central peripheral. A notch 88 of rectangular shape is also formed at an outer peripheral rim of the lower lid member 72 with an opening facing diametrically outward.

With the central projection 74 projecting toward axially upward, the upper lid member 70 is laminated on the lower lid member 72 such that their outer rim portion superimposed on each other. With this state, the upper and lower lid members 70, 72 are superimposed on the bottom of the central recess 64 of the partition member 50 so as to close the opening of the communication hole 66 and securely fixed to the bottom by means of welding, or bolts or the like. Thus, the lid unit 68 including the upper and lower lid members 70, 72 is fixed to the partition member 50. An accommodation space 90 is formed between the upper and lower lid members 70, 72 so as to extend diametrically outwardly with a generally disk-like configuration. The accommodation space 90 is held in communication with the pressure-receiving chamber 52 through the circular holes 76 of the central projection 74 and the opening 82 of the diametric projection. The accommodation space 90 is also held in communication with the equilibrium chamber 54 through the communication holes 66 of the central recess 64 and the opening 86 of the lower lid member 72. When assembling, the notch 84 of the upper lid member 70 and the notch 88 of the lower lid member 72 as well as the communication hole 58 formed through the central recess 64 of the partition member 50 are aligned at the same circumferential location. With this arrangement, the opening of the orifice passage 62 toward the pressure-receiving chamber 52 is always held in an opening state, so that the pressure-receiving chamber 52 and the equilibrium chamber 54 are always held in communication with each other.

A movable member in the form of a movable rubber plate 92 is housed within the accommodation space 90 formed between the upper and lower lid members 70, 72. This movable rubber plate 92 is a generally thin disk-shaped member having an outside diameter that is slightly smaller than au inside diameter of the central recess 74 of the upper lid member 70, and is larger than a largest diameter of the circular hole 76 and the opening 86. Further, the movable rubber plate 92 has a thickness dimension that is smaller an the height dimension of the accommodation space 90, and that is larger than the height dimension of the opening 80. The movable rubber plate 92 has a plurality of projections or recesses integrally formed on the upper and lower faces extending circumferentially continuously or intermittently with a variety of configurations. The movable rubber plate 92 is housed within the accommodation space 90 in the horizontal attitude, while being displaceable in the thickness direction (axial direction of the mount 10) by a guide along with the inner circumferential surface of the central projection 74.

With this accommodation state, the upper face of the movable rubber plate 92 is exposed to the pressure receiving chamber via the circular holes 76 formed through the upper lid member 70, and the lower face of the movable rubber plate 92 is exposed to the equilibrium chamber 54 through the opening 86 of the lower lid member 72 and the communication hole 66 of the central recess 64. As a result, the movable rubber plate 92 is subjected to the interior pressures in the pressure receiving chamber 52 and the equilibrium chamber 54 at opposite faces, so that the movable rubber plate is axially displaced based on the pressure difference between the pressure-receiving chamber 52 and the equilibrium chamber 54. In the present embodiment, the movable rubber plate 92 is readily movable in the vertical direction within a stroke limited by abutting contact thereof with the upper and lower lid members 70, 72.

When a booming noise or other high-frequency and small-amplitude vibration is applied to the engine mount 10, the movable rubber plate 92 is displaced in the axial direction, due to pressure difference between two chambers 52, 54. This induces flow of the fluid through the holes 76 and the openings 86 between the two chambers 52, 54, thereby exhibiting low dynamic spring characteristics with respect to input vibrations based on resonance or flow action of the flowing fluid, or reduced pressure in the pressure-receiving chamber 52 by mean of the pressure absorbing action based on the fluid flows.

A natural frequency of the movable rubber plate 92 is tuned so that the engine mount 10 will exhibit excellent vibration damping performance with respect to high-frequency and small-amplitude vibrations such as booming noises on the basis of resonance or flow action of the fluid flowing through the circular holes 76 and the opening 86.

Further, short passage 94 is formed within the diametric projection 78 on the outer side of the movable rubber plate 92. One end of the short passage 94 is held in communication with the pressure-receiving chamber 52 through the opening 82 of the diametric projection 78, while the other end of the short passage 94 is open to the space between the movable rubber plate 92 and the bottom wall of the central recess 64, and is held in communication with the equilibrium chamber 54 through the communication hole 66. Thus, the short passage 94 for permitting a connection between the pressure-receiving chamber 52 and the equilibrium chamber 54 with a passage length shorter then the orifice passe 62 is formed separate from the orifice passage 62. In the present embodiment, a pair of the short passages 94, 94 are located at the a circumferential positions diametrically opposed to each other with the central axis of the movable rubber plate 92 interposed therebetween.

In operation, the pressure-receiving chamber 52 undergoes fluid pressure fluctuation during input of vibrational load between the first and second mowing members 12, 14. When the fluid pressure in the pressure-receiving chamber 52 increases, the movable rubber plate 92 undergoes downward displacement and comes into contact with the lower lid member 72 to limit its downward movement. When the fluid pressure in the pressure-receiving chamber 52 decreases, on the other hand, the movable rubber plate 92 undergoes upward displacement and comes into contact with the upper lid member 70 to limit its upward movement. An axial distance between the upper and lower lid members 70, 72, and the shape and size (thickness) of the movable rubber plate 92 arm dimensioned so as to permits a given amount of displacement of the movable rubber plate 92 based on pressure fluctuation in the pressure-receiving chamber 52. Where the movable rubber plate 92 is brought into contact with the upper lid member 70, the openings 80 formed through the side wall of the central projection 74, i.e., the openings 80 of the short passages 94 on the side of the equilibrium chamber 54 are held in open to the space between the movable rubber plate 92 and the bottom wall of the central recess 64. On the other hand, where the movable rubber plate 92 is brought into contact with the lower lid member 72, the openings 80. i.e., the openings 80 of the short passages 94 to the equilibrium chamber 54 are hold in substantially closed condition by means of the outer rim of the movable rubber plate 92.

As enlargedly illustrated in FIG. 3, when the fluid pressure in the pressure-receiving chamber 52 increases as a result of compression deformation of the rubber elastic body 16, the movable rubber plate 92 is held in abutting contact with tho lower lid member 72, thereby closing the open 86 formed through the lower lid member 72. As a result, the opening 80 of the short passage 94 to the equilibrium chamber 54 is closed by means of the movable rubber plate 92, whereby the short passage 94 is held in a closed state where the communication between the pressure-receiving chamber 52 and the equilibrium chamber 54 is prohibited.

On the other hand, when the fluid pressure in the pressure-receiving chamber 52 decreases as a result of tensile deformation of the rubber elastic body 16, as enlargedly illustrate in FIG. 4, the movable rubber plate 92 is held in abutting contact with the upper lid member 70, thereby closing the circular holes 76 formed through the central projection 74 of the upper lid member 70. As a result, the opening 80 of the short passage 94 to the equilibrium chamber 54 is open to the space in the accommodation space 90, i.e., the space formed between the movable rubber plate 92 and the bottom wall of the central recess 64, and is held in communication with the equilibrium chamber 54 via the communication holes 66, whereby the short passage 94 is held in an operative state where the communication between the pressure-receiving chamber 52 and the equilibrium chamber 54 is permitted.

As noted above a through hole of the partition member 50 in the present ambient is constituted by incorporating the central recess 64 and communication holes 66, and an inner circumferential surface of the through hole, which guides the movable rubber plate 92 to displace in the axial direction, is constituted by incorporating the inner circumferential surface of the central projection 74 in the upper lid member 70. With this arrangement, the movable rubber plate 92 in situated within the through hole by means of the upper and lower lid members 70, 72. While the present invention includes a restricting plate, which is disposed in an area where the through hole is formed, and situated to be opposed to and spaced away by a given distance from the movable rubber plate 92 in the axial direction toward the equilibrium chamber 54, such a restricting plate is composed of the lower lid plate 72 of the lid unit 68 in the present embodiment. Further, a second restricting plate in the present invention, which is disposed in the same area and situated to be opposed to and spaced away by a given distance from the movable rubber plate 92 in the axial toward the pressure-receiving chamber 54, is composed of the upper lid member 70 of the lid unit 68.

With the automobile engine mount 10 of construction according to the present embodiment as described above, when the low-frequency and larger-amplitude vibration, such as engine shakes is input in the axial direction between the first and second mounting members 12, 14, a piston-like effect of the rubber elastic body 16 against the pressure receiving chamber 52 causes a relatively large pressure fluctuation in the pressure receiving chamber 52, resulting in a relative pressure fluctuation between the pressure-receiving chamber 52 and equilibrium chamber 54. This permits a desired amount of flow of the fluid through the orifice passage 62 between the two chambers 52, 54. With this arrangement, the engine mount 10 is capable of exhibiting anti vibration performance (vibration, damping effect) on the basis of resonance or flow action of the fluid through the orifice passage 52 between the pressure-receiving chamber 52 and the equilibrium chamber 54.

According to this arrangement, the displacement of the movable rubber plate 92 is effectively limited, and an amount of flow of the fluid through the short passage 94 is limited, whereby the desired amount of flow of the fluid through the orifice passage 62 is effectively obtained. Thus, the engine mount 10 will exhibit vibration-damping effect on the basis of resonance or flow action of the fluid flowing through the orifice passage 62 advantageously.

When the engine mount undergoes input vibration having high-frequency and small-amplitude such as booming noises whose frequency is higher than the tuning frequency of the orifice passage 62, the orifice passage 62 is substantially held in a closed state or the fluid is kept from flowing through the orifice passage 62 due to a large resistance to the fluid flowing therethrough. However, axial displacement of the movable rubber plate 92 disposed between the pressure receiving chamber 52 and the equilibrium chamber 54 permits flow of the fluid through the circular holes 76 and the openings 86 between the pressure-receiving chamber 52 and the equilibrium chamber 54. Thus the engine mount 10 is also capable of exhibiting an intended anti vibration performance (vibration isolating effect) with respect to high frequency and small amplitude vibration owing to resonance or flow action of the fluid through the circular holes 76 and the opening 86. Thus, the engine mount 10 is kept from exhibiting a high dynamic spring constant due to increase of the fluid pressure in the pressure-receiving chamber 52 as a result of the substantial close of the orifice passage 62, but rather is able to exhibit excellent vibration damping affect with respect to a variety of vibrations having a variety of frequencies or over a wide frequency range.

In addition, when an abrupt substantial load is applied to the engine mount 10 when the vehicle runs across the blocks or steps, the movable rubber plate 92 is held in abutting contact with the upper lid member 70 by the axial deformation thereof. Accordingly, the opening 80 of the short passage 94 to the equilibrium chamber 54 is held in open, thereby effecting the short passage 94 for communication between the pressure receiving chamber 52 and the equilibrium chamber 54, thus shorting the orifice passage 64. Since the short passage 94 has a passage length sufficiently shorter than that of the first orifice passage 62, and a resultant small resistance to the fluid flowing therethrough, if the impulsive substantial vibrational load is applied to the engine mount 10, a generation of excess negative pressure in the pressure the receiving chamber can be effectively avoided with the help of the fluid flows through the short passage 94. As a result, a separation of the gas component from the fluid sealed in the pressure receiving chamber 52 is effectively avoided, and a resultant impulsive vibration and noise caused by the separation or dissolving of the air component from or with the sealed fluid is effectively minimized or eliminated. In the present embodiment, the pair of short passages 94, 94 are arranged at diametric opposite sides with a considerable distance therebetween, generation of the impulsive negative pressure in the pressure-receiving chamber 52 can be prevented with high efficiency over a wide area.

According to the present embodiment, by means of the movable rubber plate 92 undergoing axial displacement according to the pressure fluctuation in the pressure receiving chamber 52, the operation of the short passage 94 can be ready switched between the open and closed states, without any specific structure such as valve mean or the like. Thus, the desired engine mount 10 that is capable of achieve both a desired vibration damping effect and a prevention of occurrence of noise and vibrations with simple construction.

Further, with the movable rubber plate 92 disposed within the accommodation space 90 defined between the upper and lower lid members 70, 72, an amount of axial downward displacement of the movable rubber plate 92 can be limited by an abutting contact of the movable rubber plate 92 against the lower lid member 72, while an amount of axial upward displacement of the movable rubber plate 92 can be limited by an abutting contact of the movable rubber plate 92 against the upper lid member 70. Thus, an amount of axial displacement of the movable rubber plate 92 is effectively restricted This arrangement is effective to avoid that the movable rubber plate 92 is displaced to absorb pressure fluctuation induced in the pressure-receiving chamber 52 during input of vibration having low frequency and large amplitude vibration to which the orifice passage 62 is tuned. Therefore, when the engine mount 10 is subjected to input vibration having low-frequency and large-amplitude, an amount of flow of the fluid through the orifice passage is sufficiently obtained, thereby exhibiting vibration damping effect on the basis of flow action of the fluid through the orifice 62 with improved efficiency.

In addition, the lid unit 68 in which the movable rubber plate 92 is housed and the short passage 94 is formed as being independent of the orifice passage 64, is formed separately from the partition member 50. This arrangement makes it easy to provide a fluid-filled vibration-damping device of the present invention from the conventional movable rubber plate interposed between a pressure receiving chamber and an equilibrium chamber by only disposing the conventional movable rubber plate within the lid unit 68 as the movable rubber plate 92 and assembling the lid unit 68 between the pressure receiving chamber and the equilibrium chamber, which is capable of exhibiting the substantially same operation and effect as the engine mount 10 of the present embodiment. As a result of this arrangement, the present engine mount 10 can be obtained with high production efficiency and reduced production cost, which are never achieved by the conventional fluid-filled vibration damping devices needing additional movable rubber plate and/or valve means.

Referring next to FIG. 5, there is shown a principle part of an automobile engine mount 100 of constriction according to a second embodiment of the present invention. According to the second embodiment, a movable rubber plate has a different structure from that of the first embodiment. In the following description, the same reference numerals as used in the illustrated embodiment are used for identifying structurally and functionally corresponding elements in the drawings, to facilitate understanding of the instant embodiment, and no redundant explanation is provided for these elements.

More specifically, a partition member of the engine mount 100 of the present invention, which partitioning the pressure receiving chamber 52 and the equilibrium chamber 54 from each other within the second mounting member 14, comprises a first partitioning component 102 and a second partitioning component 104. The first partitioning component 102 is an inverted cylindrical cup shape member having a circumferential groove 56 open in an outer circumferential surface thereof, and the communication hole 66 perforated through the central portion of the bottom wall thereof. An annular fitting groove 106 opening upward is formed at the opening rim of the communication hole 66. One end of the circumferential groove 56 opens upward via a first communication hole 108 formed through the bottom wall of the first partitioning component 102. The first partitioning component 102 is forcedly fitted into the small diameter portion 32 of the second mounting member 14, by press fitting or by drawing the small diameter portion 32, whereby the fluid-tight scaling of the outer circumferential surface of the first partitioning component 102 is provided.

The lower lid member 72 is fitted into the fitting groove 106 of the first partitioning component 102. In the present embodiment, the lower lid member 72 is shaped to be depressed downward at the central portion by pressing, so that the central portion of the lower lid member 72 is projected toward the communication hole 66 of the first partitioning component 102. The central portion of the lower lid member 72 has a plurality of circular openings 86 perforated therethrough.

The second partitioning component 104 is imposed on the first partitioning component 102. The second partitioning component 104 has a thick walled generally cylindrical configuration, and a bore 110 of the second partitioning component 104 has an annular shoulder portion 112 at an axially intermediate portion that is defined between a large diameter fixing recess 114 opening upward, and an axially lower small-diameter portion. On the diametrically outside of the large-diameter fixing recess 114, a second communication hole 116 is formed passing through the second partitioning component 104 in the thickness direction (i.e., the vertical direction in FIG. 5). A pair of communication grooves 118 are formed at respective positions in the circumferential direction of the annular shoulder portion 112, which are opposed to each other in one diametric direction with the central axis of the second partitioning component 104 interposed therebetween. Each communication groove 118 extends in the thickness direction of the annular shoulder portion 112 (i.e., the vertical direction in FIG. 5), and bent diametrically inwardly to open in an lower end portion of the bore 110. The second partitioning component 104 is superimposed on the first partitioning component 102, and interposed and fixed between the shoulder portion 28 of the second mounting member 14 and the lower end portion of the metallic sleeve 24. With the second partitioning component 104 superimposed on the first partitioning component 102, the lower lid member 72 fitted into the fitting groove 106 of the first partitioning component 102 is supported by and between the first and second partitioning components 102, 104. With the partitioning components 102, 104 assembled as described above, these are positioned relative to each other so that the first communication hole 108 of the first partitioning component 102 and the second communication hole 116 of the second partitioning component 104 are aligned with each other in the vertical direction.

Figure 6:
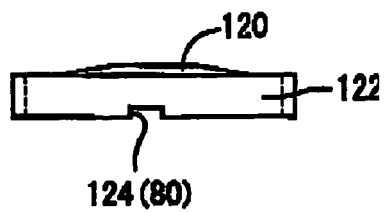
FIG. 6 is a side view of an elastic rubber plate equipped with a fixing ring, which is a component of the engine mount of FIG. 5.
Figure 7:
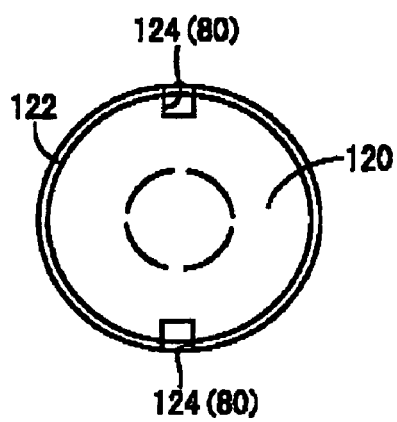
FIG. 7 is a bottom plane view of an integral vulcanization product of the elastic rubber plate equipped with the fixing ring shown in FIG. 6.

An elastic plate in the form of the elastic rubber plate 120 is equipped within the bore 110 of the second partitioning component 104. The elastic rubber plate 120, as shown in FIGS. 6 and 7, has a shallow dome shape projecting upward, and a disk-like configuration as seen in the plane view. The elastic rubber plat 120 is readily elastically deformable in the axial direction. A fixing ring 122 of generally annular configuration is bonded by vulcanization to the outer rim of the elastic rubber plate 120. That is, the elastic rubber plate 120 is formed as an integral vulcanization product equipped with the fixing ring 122. On the lower ends of the elastic rubber plate 120 and the fixing ring 122, a pair of communication grooves 124 continuously extends between the outer rim of the fixing ring 122 and the inner rim of the elastic rubber plate 120, at respective positions opposed to each other in the diametric direction with the central axis of the elastic rubber plat 120 interposed therebetween. With the central portion of the elastic rubber plate 120 projecting upward, the fixing ring 122 is press fitted into the bore 110 of the second partitioning component 104. The elastic rubber plate 120 and the second partitioning component 104 are assembled as described above, while being circumferentially positioned relative to each other such that openings of the communication grooves 118 of the second partitioning component 104 to the inner bore 110, and the communication grooves 124 in the elastic rubber plate 120 and the fixing ring 122 are overlapped with each other.

Figure 8:
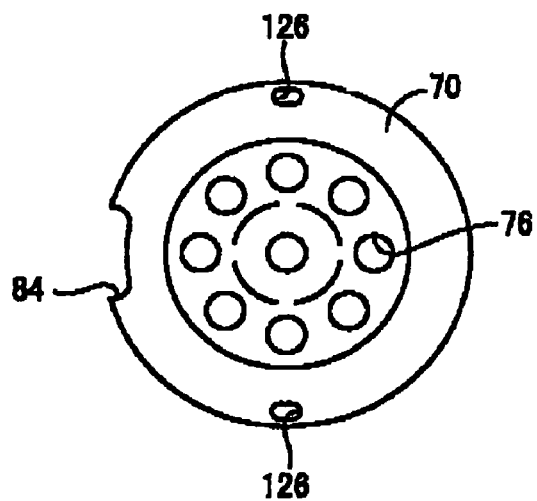
FIG. 8 is a top plane view of an upper lid of the engine mount of FIG. 5.

The fixing recess 114 of the second partitioning component 104 houses the upper lid member 70. The upper lid member 70, as shown in FIG. 8, has a shallow dome shape projecting upward, and a disk-like configuration as seen in the plane view. The upper lid member 70 has a plurality of circular holes 76 perforated through the central portion thereof, and a pair of connecting holes 126, 126 of the upper lid member 70 perforated through the outer rim thereof at respective circumferential positions opposed to each other in the diametric direction with the central axis of the upper lid member 70 therebetween. With the central portion projecting upward, the upper lid member 70 is fitted into the fixing recess 114 of the second partitioning component 104, and is superimposed at its outer rim onto the annular shoulder portion 112 of the second partitioning component 104, and then fixed thereto by means of bolts or by welding. With this state, the upper lid member 70 and the second partitioning component 104 are circumferentially positioned relative to each other such that the connecting holes 126 of the upper lid member 70 overlap with the upper openings of the communication grooves 118 of the second partitioning component 104, respectively.

With the above described arrangement, the upper face of the elastic rubber plate 120 is exposed to the pressure receiving chamber 52 via the circular holes 76 perforated through the central portion of the upper lid member 70. The lower face of the elastic rubber plate 120, on the other hand, is exposed to the equilibrium chamber 54 via the communication hole 66 perforated through the bottom wall of the first partitioning component 102. Accordingly, the elastic rubber plate 120 receives the interior pressure both in the pressure receiving chamber 52 and the equilibrium chamber 54 at upper and lower faces thereof, respectively, so that the elastic rubber plate 120 undergoes axial deformation based on pressure difference between the pressure-receiving chamber 52 and the equilibrium chamber 54. Owing to the elastic deformation of the elastic rubber plate 120, the fluid is forced to flow through the circular holes 76 of the upper lid member 70 and the opening 86 of the second lid member 72, so that the engine mount 100 of the present embodiment will exhibit low dynamic spring constant with respect to input vibration on the basis of resonance of the fluid or fluid pressure absorbing effect in the pressure receiving chamber 52. The natural frequency of the elastic rubber plate 120 is turned so that the engine mount 100 will exhibit vibration-damping effect with respect to high frequency and small amplitude vibrations such as booming noises, with the help of resonance of the fluid flowing through the circular holes 76 and the opening 86 due to the elastic deformation of the elastic rubber plat 120.

With the above described arrangement, the opening of the circumferential groove 56 of the first partitioning component 102 is fluid-tightly closet by means of the second mounting member 14, whereby the orifice passage 62 is formed, and the open end of the orifice passage 62 to the pressure receiving chamber 52 is held in communication with the pressure receiving chamber 52 through the first communication hole 108 of the first partitioning component 102 and the second communication hole of the second partitioning component 104.

On the outer circumferential portion of the rubber elastic body 120 disposed between the first and second partitioning components 102, 104, the connecting hole 126, of the upper lid member 70, the communication grooves 118 of the second partitioning component 104, the fixing ring 122, and the communication grooves 124 of the elastic rubber plate 120 cooperate together to form the short passages 94 in the present embodiment. The pair of short passages 94, 94 are located opposed to each other in the diametric direction with the central axis interposed therebetween. Each short passage 94 is communicated at one and with the pressure receiving chamber 52 via the connecting hole 126, and at the other end with a space between the elastic rubber plate 120 and the lower lid member 72 via the fixing ring 122 and the communication grooves 124 of the elastic rubber plate 120, and with the equilibrium chamber 54 via the openings 86 of the lower lid member 72 and the communication holes 66 of the first partitioning component 102. Thus, the pair of short passages 94, 94 are formed separately from the orifice passage 62, like in the first embodiment, and permit a fluid communication between the pressure receiving chamber 52 and the equilibrium chamber 54 with a passage length shorter than the orifice passage 62.

In operation, the pressure-receiving chamber 52 undergoes fluid pressure fluctuation during input of vibrational load between the first and second mounting members 12, 14. When the fluid pressure in the pressure-receiving chamber 52 increases, the elastic rubber plate 120 undergoes downward deformation and comes into close contact with the lower lid member 72 to limit its down movement. When the fluid pressure in the pressure-receiving chamber 52 decreases, on the other hand, the elastic rubber plate 120 undergoes upward deformation and comes into close contact with the upper lid member 70 to limit its upward movement. The shape, size, spring characteristics and other features of the elastic rubber plate 120 is determined so that the elastic rubber plate 120 is elastically deformed in the axial direction based on pressure fluctuation in the pressure-receiving chamber 52.

Where the elastic rubber plate 120 is brought into close contact with the upper lid member 70, the communication grooves 124 formed in the lower end faces of the elastic rubber plate 120 and the fixing ring 122, i.e., the openings 80 of the short passages 94 on the side of the equilibrium chamber 54 are held in open to the space between the elastic rubber plate 120 and the lower lid member 72. On the other hand, where the elastic rubber plate 120 is held in close contact with the lower lid member 72, the openings 80 of the short passages 94 to the equilibrium chamber 54 are held in substantially closed condition by means of the outer rim or bottom of the elastic rubber plate 120.

Figure 9:
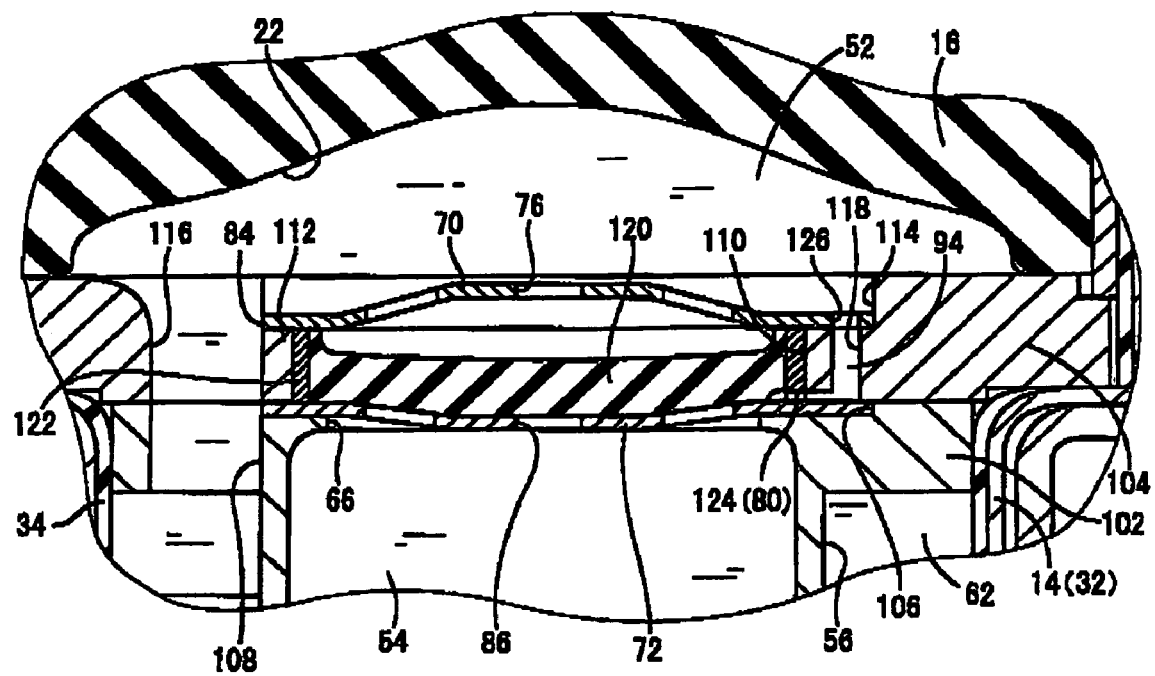
FIG. 9 is a fragmentary enlarged view in vertical cross section of the engine mount of FIG. 5 in one operating state.

Accordingly, when the fluid pressure in the pressure-receiving chamber 52 increases due to compression deformation of the rubber elastic body 16, the elastic rubber plate 120 is entirely held in close contact with the lower lid member as enlargedly illustrated in FIG. 9. Thus, the openings 86 formed through the lower lid member 72 are fluid-tightly closed by means of the elastic rubber plate 120, and the openings 80 of the short passages 94 to the equilibrium chamber 54 is fluid-tightly closed also. As a result, the short passage 94 is held in the closed state where the communication between the pressure receiving chamber 52 and the equilibrium chamber 54 through the short passages 94 is inhibited.

Figure 10:
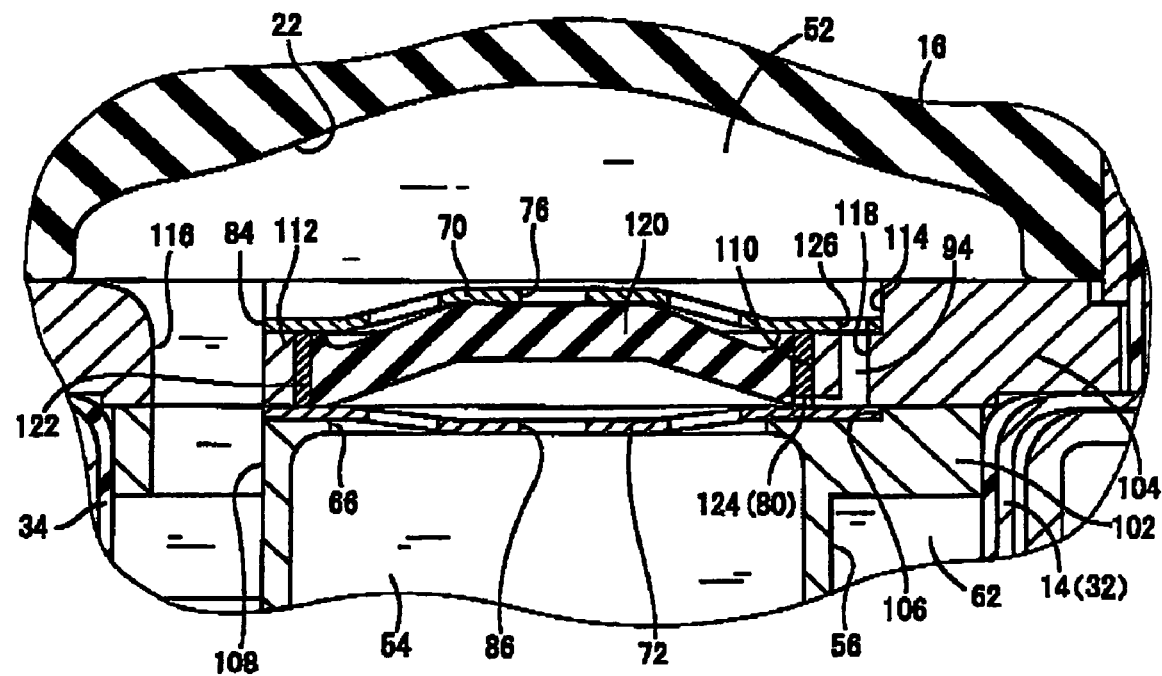
FIG. 10 is a fragmentary enlarged view in vertical cross section of the engine mount of FIG. 5 in another operating state.

When the fluid pressure in the pressure-receiving chamber 52 decreases due to tensile deformation of the rubber elastic body 16, on the other hand the elastic rubber plate 120 is hold in close contact with the central portion of the upper lid member 70, as enlargedly illustrated in FIG. 10. Thus, the circular holes 76 formed through the upper lid member 70 are fluid-tightly closed by means of the elastic rubber plate 120, whereas the openings 80 of the short passages 94 to the equilibrium chamber 54 is open to the space between the elastic rubber plate 120 and the lower lid member 72, and finally to the equilibrium chamber 54 via the openings 86 of the lower lid member 72 and the communication holes of the first partitioning component 102. As a result, the short passage 94 is held in the open state where the communication between the pressure receiving chamber 52 and the equilibrium chamber 54 through the short passage 94 in permitted.

As noted above, through holes perforated through the first and second partitioning component 102, 104 should be interpreted to include the communication holes 66 of the first partitioning component 102, the fixing recess 114 and the inner bore 110 of the second partitioning component 104. Further, an inner circumferential surface of the through hole into which an outer rim of the elastic rubber plate 120 is bonded, should be interpreted to include the inner circumferential surface of the fixing ring 122 and the inner bore 110 of the first partitioning component 102.

In the engine mount 10 of construction as described above, the short passage 94 can be effected or closed by means of the elastic deformation of the elastic rubber plate 120 in accordance with pressure fluctuation in the pressure receiving chamber 52. Thus, the engine mount 100 will provide the same operation and affect as the engine mount 10 of the first embodiment, thereby exhibiting advantageous vibration damping performance on the basis of resonance or flow action of the fluid through the orifice passage 62, while effectively minimizing occurrence of impulsive vibration and noise caused by separation of gas from the non-compressible fluid sealed in the pressure receiving chamber 52.

Additionally, since the elastic rubber plate 120 operable for effecting/closing the short passage 94 is affixed to the first partitioning component 102 via the fixing ring 122 in the present embodiment, the elastic rubber plate 120 is stably supported within the through hole between the pressure-receiving chamber 52 and the equilibrium chamber 54. Also the elastic rubber plate 120 is brought into close contact with the upper and lower lid members 70, 72 as a result of the elastic deformation itself. This arrangement assures certain change of the operating state of the short passages 94 between the closed state and the open state, ensuring further improved vibration damping effect, impulsive noise attenuating effect, and the like.

While the presently preferred embodiments of this invention have been described above in detail for the illustrative purpose only, it is to be understood that the present invention is not limited to the details of the illustrated embodiments, but may be otherwise embodied with various other changes, modifications and improvements which may occur to those skilled in the art, without departing from the spirit and scope of the invention defined in the following claims.

For instance, the shape size, construction and other features of the orifice passage are not particularly limited to those of the illustrated embodiment. While the automobile engine mounts having one orifice passage according to the present invention have been described in detail, the principle of the present invention may also be applicable to the engine mount having a plurality of orifice passages, and other types of fluid-filled vibration damping devices.

The shape, size and other structural features of the short passage are not particularly limited to those in the illustrated embodiment. While a pair of short passages are employed in the illustrated embodiment, one or three or more short passage may be desirably formed.

While in the illustrated embodiment, the short passage is formed independently of the orifice passage, the short passage may be formed by utilizing a part of the orifice passage, for example by branching the short passage from a circumferential portion of the orifice passage in order to open the outer peripheral portion of the movable member in the partition member.

The movable member of the present invention is not limited to the illustrated movable rubber plate or elastic rubber plate, and may have a variety of constructions provided it is displaceable or deformable in the axial direction between the pressure receiving chamber and the equilibrium chamber.

Additionally, while the automotive engine mounts have been described as preferred embodiments of the present invention, the principle of the present invention may be equally applicable to a body mount, a differential mount, or other mount for automotive vehicles, or a variety of vibration damping devices for other than automotive vehicles.

What is claimed is:

1. A fluid-filled vibration damping device comprising:
    a first mounting member;
    a second mounting member disposed spaced away from the first mounting member;
    a rubber elastic body elastically connecting the first and second mounting members together;
    a pressure receiving chamber partially defined by the rubber elastic body and filled with a non-compressible fluid, the pressure receiving chamber undergoing fluid pressure fluctuation during input of vibration to the device;
    an equilibrium chamber partially defined by a flexible layer for permitting a volume change thereof and filled with the non-compressible fluid;
    an orifice passage permitting a fluid communication between the pressure receiving chamber and the equilibrium chamber;
    a movable member disposed so as to partition the pressure receiving chamber and the equilibrium chamber from each other, and being elastically displaceable or deformable due to pressure difference between the pressure receiving chamber and the equilibrium chamber exerted on opposite faces thereof so that pressure fluctuation induced in the pressure receiving chamber in a frequency band higher than a tuning frequency of the orifice passage is absorbed to avoid a high dynamic spring constant of the mount;
    at least one short passage connecting between the pressure receiving chamber and the equilibrium chamber with a passage length smaller than that of the orifice passage, wherein an equilibrium-chamber-side opening of the short passage is open to a region where the movable member is displaced or deformed, and when pressure in the pressure-receiving chamber increases, the movable member is displaced or deformed toward the equilibrium chamber to thereby close the equilibrium-chamber-side opening of the short passage to have the short passage substantially closed, while when pressure in the pressure-receiving chamber decreases, the movable member is displaced or deformed toward the pressure-receiving chamber to have the short passage operative.

2. A fluid-filled vibration damping device according to claim 1, wherein a partition member is fixedly supported by the second mounting member, and is provided with a through hole, and the movable member is disposed within the through hole and is supported in a displaceable or deformable state by means of the partition member, while the orifice passage is formed radially outward of the movable member by utilizing the partition member.

3. A fluid-filled vibration damping device according to claim 2, wherein a plurality of short passages are formed at respective circumferential positions situated radially outward of the movable member.

4. A fluid-filled vibration damping device according to claim 2, further comprising a first restricting plate disposed in an area where the through hole is formed, and situated to be opposed to and spaced away by a given distance from the movable member in an axial direction toward the equilibrium chamber, wherein the first restricting plate has an opening perforated through a central portion thereof so as to permit displacement or deformation of the movable member by means of fluid flow through the opening of the first restricting plate, and the displacement or deformation of the movable member is limited by bringing the movable member into abutting contact with the first restricting plate, wherein the equilibrium-chamber-side opening of the short passage is open to an area between the movable member and the first restricting plate so that the short passage is held in communication with the equilibrium chamber via the through hole of the first restricting plate, and wherein when pressure in the pressure-receiving chamber increases, the movable member is displaced or deformed toward the equilibrium chamber and is held in abutting contact with the first restricting member so that through hole is closed to have the short passage closed.

5. A fluid-filled vibration damping device according to claim 4, wherein the movable member comprises a movable plate formed independently of the partition member, and the movable plate is disposed within the through hole of the partition member such that the movable plate is displaceable in a thickness direction thereof while being guided along an inner circumferential surface of the through hole of the partition member, and the equilibrium-chamber-side opening of the short passage is open to a vicinity of an equilibrium-chamber-side end of the inner circumferential surface of the through hole of the partition member.

6. A fluid-filled vibration damping device according to claim 4, wherein the movable member comprises an elastic plate that is disposed within the through hole of the partition member with an outer rim thereof bonded to an inner circumferential surface of the through hole so that the elastic plate is elastically deformable in a thickness direction thereof, and the equilibrium-chamber-side opening of the short passage is open to a vicinity of an equilibrium-chamber-side end of the inner circumferential surface of the through hole.

7. A fluid-filled vibration damping device according to claim 4, further comprising a second restricting plate disposed in an area where the through hole of the partition member is formed, and situated to be opposed to and spaced away by a given distance from the movable member in an axial direction toward the pressure receiving chamber, wherein the second restricting plate has an opening perforated through a central portion thereof so as to permit displacement or deformation of the movable member by means of fluid flow through the opening of the second restricting plate, and when pressure in the pressure-receiving chamber decreases, the movable member is displaced or deformed toward the pressure-receiving chamber and is held in abutting contact with the second restricting member to limit its upward movement.

8. A fluid-filled vibration damping device according to claim 2, wherein the second mounting member is of cylindrical tubular configuration, the first mounting member is situated on a side of one open end of the second mounting member with a spacing therebetween, the rubber elastic body is disposed between and elastically connects the first and second mounting member with the one open end of the second mounting member fluid-tightly closed by means of the rubber elastic body, an other open end of the second mounting member is fluid-tightly closed by the flexible layer, the partition member is supported by the second mounting member to extend in a direction perpendicular to an central axis of the second mounting member so that the pressure receiving chamber is defined between the partition member and the rubber elastic body while the equilibrium chamber is defined between the partition member and the flexible layer.

9. A fluid-filled vibration damping device according to claim 1, wherein the device is used as an automotive engine mount by fixing one of the first and second mounting members to a power unit of a vehicle, and an other of the first and second mounting members to a body of the vehicle, and the orifice passage is tuned to a low frequency band corresponding to engine shakes, and the movable member is tuned so that the engine mount exhibits low dynamic spring constant during input of high frequency vibration corresponding to booming noises by means of displacement or deformation of the movable member.

* * * * *